(12) United States Patent
Noh et al.

(10) Patent No.: US 8,908,967 B2
(45) Date of Patent: Dec. 9, 2014

(54) IMAGE PROCESSING METHOD USING FOREGROUND PROBABILITY

(71) Applicants: Samsung Techwin Co., Ltd., Changwon (KR); Korea University Research and Business Foundation, Seoul (KR)

(72) Inventors: Seung-in Noh, Changwon (KR); Han-seok Ko, Seoul (KR); Tae-yup Song, Seoul (KR); Young-hyun Lee, Seoul (KR); Han-jun Kim, Seoul (KR); Bon-hwa Ku, Seoul (KR)

(73) Assignees: Samsung Techwin Co., Ltd., Changwon (KR); Korea University Research and Business Foundation, Seoul (KR)

( * ) Notice: Subject to any disclaimer, the term of this patent is extended or adjusted under 35 U.S.C. 154(b) by 102 days.

(21) Appl. No.: 13/675,474

(22) Filed: Nov. 13, 2012

(65) Prior Publication Data

US 2013/0243322 A1    Sep. 19, 2013

(51) Int. Cl.
| | | |
|---|---|---|
| G06K 9/00 | (2006.01) | |
| G06K 9/38 | (2006.01) | |
| G06T 7/00 | (2006.01) | |
| G06K 9/64 | (2006.01) | |

(52) U.S. Cl.
CPC ......... *G06K 9/64* (2013.01); *G06T 2207/10016* (2013.01); *G06K 9/00771* (2013.01); *G06K 9/38* (2013.01); *G06T 7/0087* (2013.01); *G06T 7/0081* (2013.01); *G06T 2207/30232* (2013.01); *G06T 2207/20144* (2013.01)
USPC .......................................... 382/171; 382/173

(58) Field of Classification Search
None
See application file for complete search history.

(56) References Cited

U.S. PATENT DOCUMENTS

| | | | |
|---|---|---|---|
| 5,969,755 A * | 10/1999 | Courtney | 348/143 |
| 7,702,131 B2 * | 4/2010 | Chinen et al. | 382/103 |
| 8,290,253 B1 * | 10/2012 | Wang et al. | 382/162 |
| 8,320,613 B2 * | 11/2012 | Krahnstoever et al. | 382/103 |
| 2003/0194110 A1 * | 10/2003 | Brodsky | 382/103 |
| 2004/0239762 A1 * | 12/2004 | Porikli et al. | 348/169 |
| 2007/0031005 A1 * | 2/2007 | Paragios et al. | 382/103 |
| 2008/0077953 A1 * | 3/2008 | Fernandez et al. | 725/32 |
| 2009/0033745 A1 * | 2/2009 | Yeredor et al. | 348/152 |
| 2011/0150282 A1 * | 6/2011 | Gupta | 382/103 |
| 2012/0154580 A1 * | 6/2012 | Huang et al. | 348/143 |
| 2013/0129156 A1 * | 5/2013 | Wang et al. | 382/107 |
| 2013/0308856 A1 * | 11/2013 | Carpenter et al. | 382/164 |

FOREIGN PATENT DOCUMENTS

| | | |
|---|---|---|
| JP | 2002-373335 A | 12/2002 |
| KR | 10-2009-0111939 A | 10/2009 |
| KR | 10-1038650 B1 | 6/2011 |
| KR | 10-2011-0104195 A | 9/2011 |

* cited by examiner

*Primary Examiner* — Li Liu
(74) *Attorney, Agent, or Firm* — Sughrue Mion, PLLC

(57) ABSTRACT

An image processing method of separating an input image into a foreground image and a background image, the method including determining a pixel of the input image as a pixel of the foreground image if a foreground probability value of the pixel of the foreground image determined by using the Gaussian mixture model or the pixel determined to be included in a motion region is greater than a setting threshold.

20 Claims, 9 Drawing Sheets

IMAGE PROCESSING METHOD USING FOREGROUND PROBABILITY

CROSS-REFERENCE TO RELATED PATENT APPLICATION

This application claims priority from Korean Patent Application No. 10-2012-0025660, filed on Mar. 13, 2012, in the Korean Intellectual Property Office, the disclosure of which is incorporated herein in its entirety by reference.

BACKGROUND

1. Field

Methods consistent with exemplary embodiments relate to image processing, and more particularly, to receiving an image from an image capturing device such as a surveillance camera for capturing an inside of an elevator and separating the received image into a foreground image and a background image.

2. Description of the Related Art

Surveillance systems need to separate a received image into a foreground image and a background image to perform various surveillance functions. That is, host apparatuses receive an image from a surveillance camera, determine whether each pixel of the received image is a pixel of a foreground image or a pixel of a background image, and separate the received image into the foreground image and the background image.

To separate the received image into the foreground image and the background image, conventionally, a Gaussian model was used to determine a pixel of the foreground image or a pixel of the background image (see Korean Patent Registration No. 1038650).

Such an image separation method is not robust and has a low separation accuracy with respect to an environment including a reflector and a frequent change in illumination, such as an inside of an elevator.

SUMMARY

One or more exemplary embodiments provide an image processing method of separating a received image into a foreground image and a background image, that is robust and enhances separation accuracy with respect to an environment including a reflector and a frequent change in illumination, such as the inside of an elevator.

According to an aspect of an exemplary embodiment, there is provided an image processing method including: (a) determining whether a pixel of an input image is a pixel of a foreground image or a pixel of the background image by using a Gaussian mixture model; (b) determining whether the pixel of the input image is included in a motion region; (c) obtaining a foreground probability value of the pixel of the input image according to a foreground probability histogram with respect to a correlation between the input image and a reference image of the input image; and (d) determining the pixel of the input image as the pixel of the foreground image if the foreground probability value of the pixel of the foreground image determined by using the Gaussian mixture model or the pixel determined to be included in the motion region is greater than a setting threshold.

The input image may include a series of frame images of video, wherein operations (a) through (d) are repeatedly performed.

In operation (c), the reference image may be separated into a foreground and a background, and renewed as a previous image during a process of repeatedly performing operations (a) through (d).

In operation (c), the correlation between the input image and the reference image of the input image may be calculated with respect to the pixel of the input image by using a texture value of the pixel that is a difference between a mean gradation value of the pixel and neighboring pixels and gradation values of the neighboring pixels.

The input image may be an image of an inside of a closed space captured by an image obtaining unit.

The method may further include: (e), if the pixel determined as the pixel of the foreground image is not connected to an image of a floor of the closed space, setting the pixel determined as the pixel of the foreground image as a pixel of the background image.

In operation (c), the correlation between the input image and the reference image may be calculated with respect to the pixel of the input image by using a texture value of the pixel that is a difference between a mean gradation value of the pixel and neighboring pixels and gradation values of the neighboring pixels.

The input image may include a series of frame images of video, wherein operations (a) through (d) are repeatedly performed.

In operation (c), the reference image may be separated into a foreground and a background, and renewed as a previous image during a process of repeatedly performing operations (a) through (d).

According to an aspect of another exemplary embodiment, there is provided an image processing method of receiving an image from a surveillance camera for capturing an inside of a closed space having a door to an outside, determining whether each pixel of the received image is a pixel of a foreground image or a pixel of a background image, and separating the received image into the foreground image and the background image, the method including: (a) determining whether a pixel of the received image is a pixel of a foreground image or a pixel of a background image by using a Gaussian mixture model; (b) determining whether the pixel of the received image is included in a motion region; (c) obtaining a foreground probability value of the pixel of the received image according to a foreground probability histogram with respect to correlation between the received image and a reference image of the received image; (d) if the foreground probability value of the pixel of the foreground image determined by using the Gaussian mixture model or the pixel determined to be included in the motion region is greater than a setting threshold, obtaining a foreground-information binary number "1" as a first foreground determination value of the pixel of the received image, and, if the foreground probability value is not greater than the setting threshold, obtaining a background-information binary number "0" as the first foreground determination value; (e) determining whether the door of the closed space is open or closed; (f) if the door of the closed space is open, setting an auxiliary foreground determination value in the same way as the first foreground determination value, and, if the door of the elevator is closed, obtaining a final foreground determination value of a previous image and the auxiliary foreground determination value set based on the first foreground determination value; and (g) if a result obtained by multiplying the auxiliary foreground determination value and the foreground probability value is greater than a final threshold, obtaining a final foreground determination value as the foreground-information binary number "1", and, if the result is not greater than the final threshold, obtaining the final foreground determination value as the background-information binary number "0".

The method may further include: (h) if the pixel determined as the pixel of the foreground image is not connected to an image of a floor of the closed space, setting the pixel determined as the pixel of the foreground image as the pixel of the background image.

The received image may include a series of frame images of video, wherein operations (a) through (g) are repeatedly performed.

In operation (c), the reference image may be separated into a foreground and a background, and renewed as a previous image during a process of repeatedly performing operations (a) through (g).

Operation (e) may include: if a mean foreground probability value of pixels corresponding to top portions of the door of the closed space is greater than a setting mean threshold, determining the door of the closed space to be open.

In operation (c), the correlation between the received image and the reference image of the received image may be calculated with respect to the pixel of the received image by using a texture value of the pixel that is a difference between a mean gradation value of the pixel and neighboring pixels and gradation values of the neighboring pixels.

BRIEF DESCRIPTION OF THE DRAWINGS

The above and other aspects will become more apparent by describing in detail exemplary embodiments with reference to the attached drawings, in which.

DETAILED DESCRIPTION OF EXEMPLARY EMBODIMENTS

The inventive concept will now be described more fully with reference to the accompanying drawings, in which exemplary embodiments of the invention are shown. The inventive concept may, however, be embodied in many different forms and should not be construed as being limited to the embodiments set forth herein; rather, these embodiments are provided so that this disclosure will be thorough and complete, and will fully convey the concept of the inventive concept to those of ordinary skill in the art.

Figure 1:
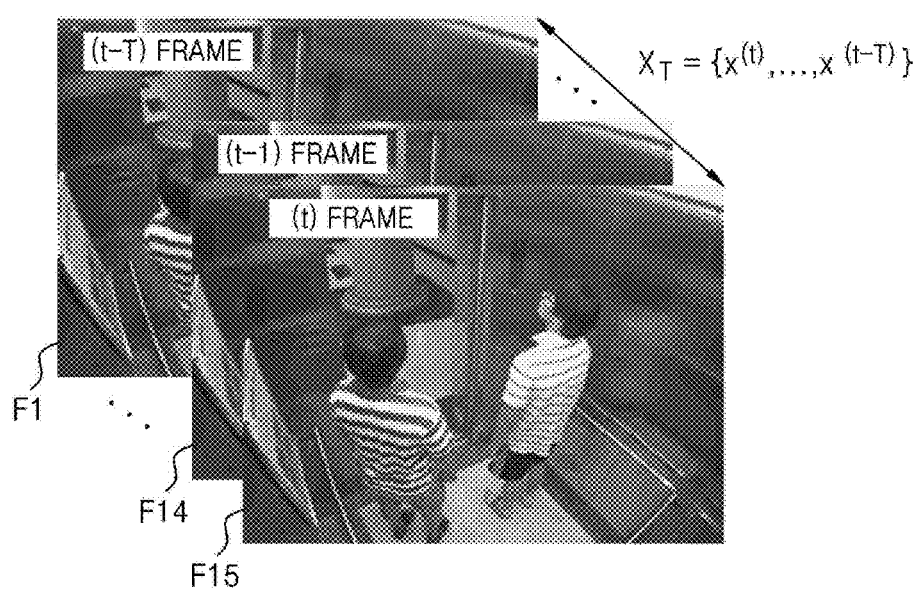
FIG. 1 is a diagram for explaining a received image to which an image processing method is to be applied, according to an exemplary embodiment.

FIG. 1 is a diagram for explaining a received image $X_T$ to which an image processing method is to be applied, according to an exemplary embodiment.

Referring to FIG. 1, the received image $X_T$ includes images $x^{(t)}, \ldots, x^{(t-T)}$ of a series of frames, for example, F1-F15, of video input during a setting period T. In this regard, t denotes time. All of the images $x^{(t)}, \ldots, x^{(t-T)}$ of the frames F1-F15 may be used or a representative image thereof may be used.

Figure 2:
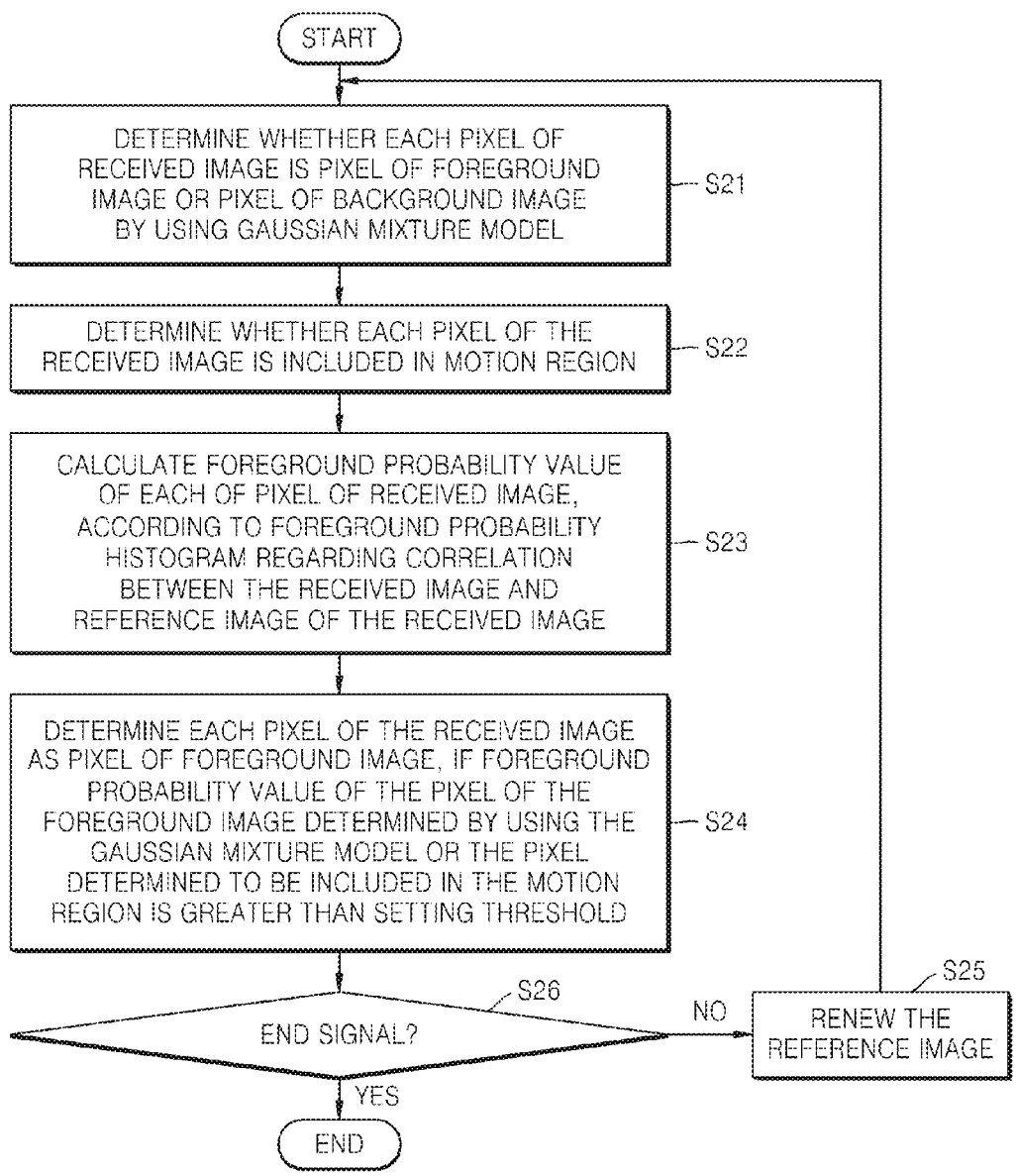
FIG. 2 is a flowchart of an image processing method, according to an exemplary embodiment.
Figure 3:
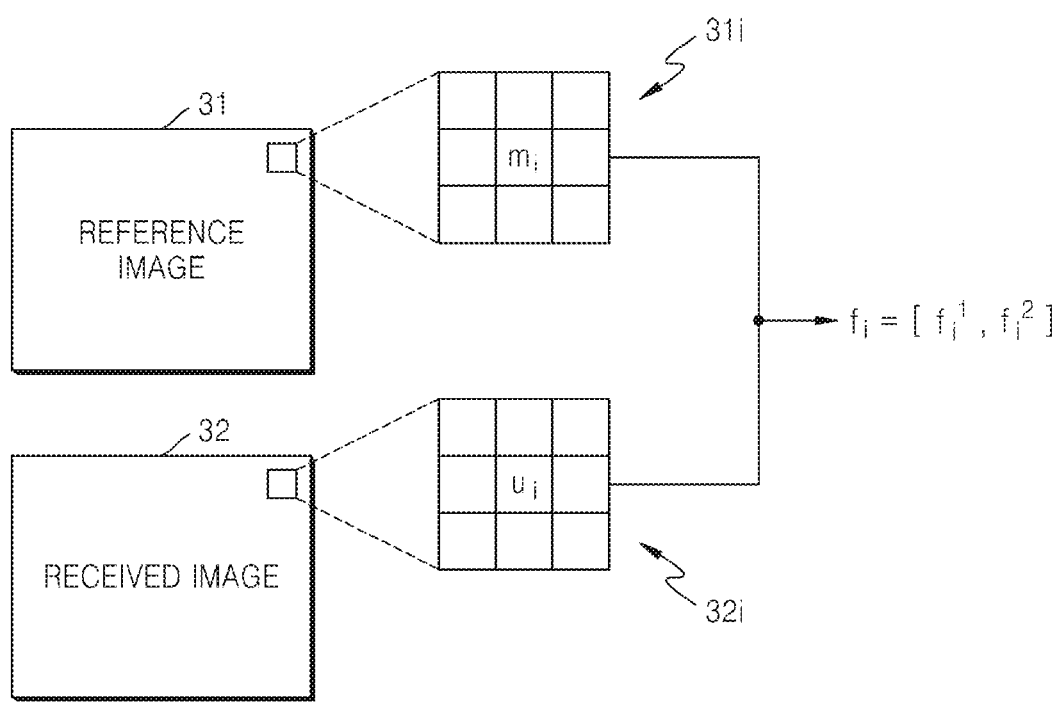
FIG. 3 is a diagram for explaining an operation of calculating a foreground probability value of FIG. 2, according to an exemplary embodiment.
Figure 4:
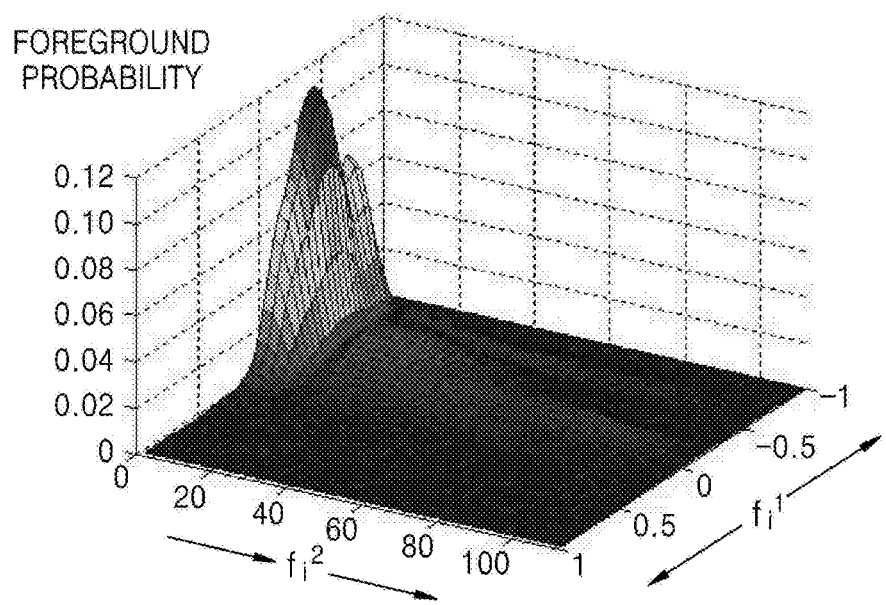
FIG. 4 shows an example of a histogram of a foreground probability with respect to a correlation between a reference image and a received image.
Figure 5:
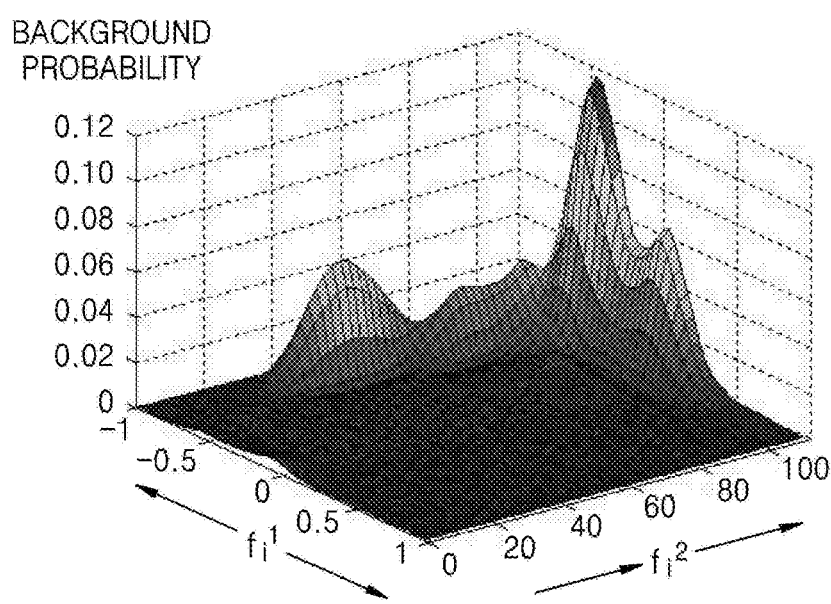
FIG. 5 shows an example of a histogram of a background probability with respect to a correlation between a reference image and a received image.
Figure 6:
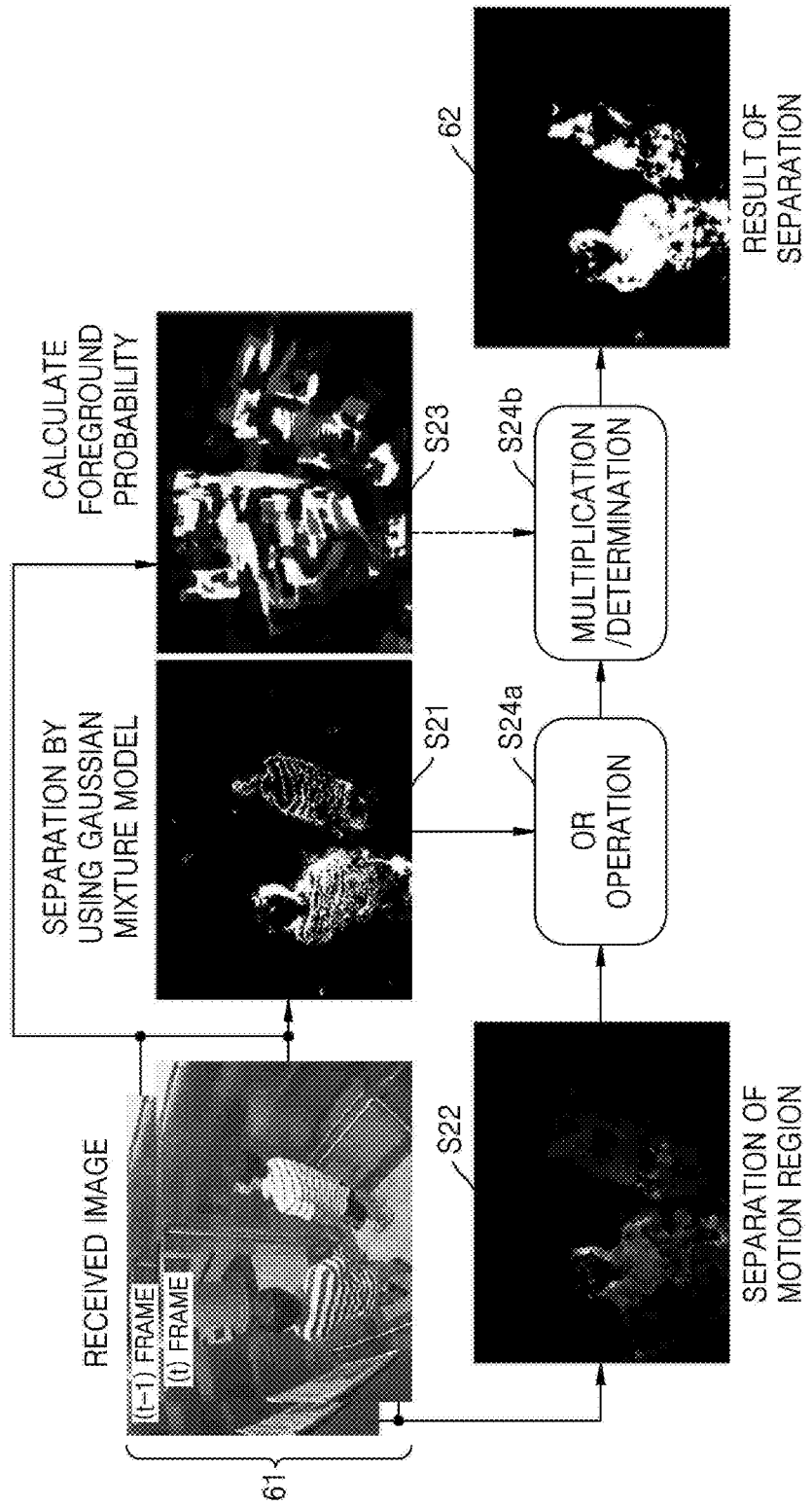
FIG. 6 is a diagram for explaining the image processing method of FIG. 2, according to an exemplary embodiment.

FIG. 2 is a flowchart of an image processing method, according to an exemplary embodiment. FIG. 3 is a diagram for explaining an operation S23 of calculating a foreground probability value PFG(fi|xi) of FIG. 2. FIG. 4 shows an example of a histogram of a foreground probability with respect to a correlation $f_i$ between a reference image 31 and a received image 32 in FIG. 3 or 61 in FIG. 6. FIG. 5 shows an example of a histogram of a background probability with respect to the correlation f, between the reference image 31 and the received image 32 or 61. FIG. 6 is a diagram for explaining the image processing method of FIG. 2.

The same reference numerals of FIGS. 1 through 6 denote the same elements.

Referring to FIGS. 1 through 6, the image processing method of FIG. 2 receives an image 61 from a surveillance camera for capturing, for example, an inside of an elevator, determines whether each pixel of the received image 61 is a pixel of a foreground image or a pixel of a background image, and separates the received image 61 into the foreground image and the background image. The image processing method of FIG. 2 includes operations S21 through S26.

In operation S21, a Gaussian mixture model is used to determine whether each pixel of the received image 61 is the pixel of the foreground image or the pixel of the background image.

In more detail, in a case where an M number of image frames are input during the setting period T, a Gaussian mixture distribution of a pixel at a time t may be expressed according to Equation 1 below.

$$p(\bar{x} \mid X_T, BG + FG) = \sum_{m=1}^{M} \pi_m N(\bar{x}, \hat{\mu}_m, \hat{\sigma}_m^2 I) \quad \text{[Equation 1]}$$

In Equation 1 above, p denotes a probability, x denotes gradation of a pixel, $X_T$ denotes the received image, BG denotes a pixel of a background image probability, FG denotes a pixel of a background image probability, $\pi_m$ denotes a weighted value of an $m^{th}$ Gaussian distribution, N denotes a normal distribution, $\mu_m$ denotes a mean value of the $m^{th}$ Gaussian distribution, $\sigma_m^2$ denotes a variance value $x^{(t)} - \mu_m$ of the $m^{th}$ Gaussian distribution, and I denotes a constant.

As is well known, in a case where gradation of a pixel is input at a next time t+1, a Gaussian distribution is recursively renewed according to Equations 2 through 4 below.

$$\hat{\pi}_m \leftarrow \hat{\pi}_m + \alpha(o_m^{(t)} - \hat{\pi}_m) \quad \text{[Equation 2]}$$

$$\hat{\mu}_m \leftarrow \hat{\mu}_m + o_m^{(t)}(\alpha/\hat{\pi}_m)\vec{\delta}_m \quad \text{[Equation 3]}$$

$$\hat{\sigma}_m^2 \leftarrow \hat{\sigma}_m^2 + o_m^{(t)}(\alpha/\hat{\pi}_m)(\vec{\delta}_m^T \vec{\delta}_m - \hat{\sigma}_m^2) \quad \text{[Equation 4]}$$

In Equations 2 through 4 above, α denotes a setting constant. $o_m$ has a value "1" in a case where the gradation of the pixel at the time t matches the Gaussian distribution, and has a value "0" in a case where the gradation of the pixel at the time t does not match the Gaussian distribution.

In this regard, a Gaussian distribution of gradation of the pixel corresponding to the background image has a large weighted value $\pi_m$ and a small variance value $\sigma_m^2$, compared to a Gaussian distribution of gradation of the pixel corresponding to the foreground image.

Such characteristics may be used to obtain a background probability of the pixel by summing a B number of weighted values $\pi_m$ in a sequence of ascending weighted values $\pi_m$. That is, in a case where a value of the background probability is greater than a setting threshold, the pixel is determined as a pixel of the background image, and, in a case where the value of the background probability is not greater than the setting threshold, the pixel is determined as a pixel of the foreground image according to Equation 5 below.

$$p(\bar{x} \mid X_T, BG) \cong \sum_{m=1}^{B} \hat{\pi}_m N(x \mid \hat{\mu}_m, \sigma_m^2 I) \quad \text{[Equation 5]}$$

In operation S22, it is determined whether the received image 61 is included in a motion region. That is, the motion region is separated from the received image 61. In addition to an algorithm for detecting the motion region that uses optical flow, various other algorithms are well known, and thus, detailed descriptions thereof are omitted here.

In operation S23, the foreground probability value PFG (fi|xi) of each of pixels of the received images 32 or 61 is calculated according to the foreground probability histogram (FIG. 4) regarding the correlation $f_i$ between the received images 32 or 61 and the reference image 31 of the received images 32 and 61.

In the present embodiment, the reference image 31 is separated into a foreground and a background, and is renewed (operation S25) to a previous image during a process of repeatedly performing operations S21 through S24 until an end signal is generated (operation S26). Thus, accuracy of the foreground probability value PFG(fi|xi) increases.

In operation S23, a texture value of a target pixel that is a difference between a mean gradation value $(\bar{m}_i, \bar{u}_i)$ of the target pixel and eight neighboring pixels and gradation values $m_j, u_j$ of the eight neighboring pixels is used to calculate the correlation $f_i$ between the received images 32 or 61 and the reference image 31 of the received images 32 or 61. Accordingly, the image processing state may be made further robust and separation accuracy may be enhanced.

The correlation $f_i$ between the received images 32 or 61 and the reference image 31 of the received images 32 or 61 includes a normalized cross correlation (NCC) function $f_i^1$ and a texture feature function $f_i^2$ of Equations 6 and 7, respectively, below.

$$f_i^1 = \frac{\sum_{j \in \omega_1} (u_j - \bar{u}_i)(m_j - \bar{m}_i)}{\sqrt{\sum_{j \in \omega_1} (u_j - \bar{u}_i)^2 \sum_{j \in \omega_1} (m_j - \bar{m}_i)^2}} \quad \text{[Equation 6]}$$

$$f_i^2 = \sqrt{\sum_{j \in \omega_1} (u_j - \bar{u}_i)^2} + \sqrt{\sum_{j \in \omega_1} (m_j - \bar{m}_i)^2} \quad \text{[Equation 7]}$$

In Equations 6 and 7 above, i denotes the target pixel, j denotes neighboring pixels, ω denotes a window, $\bar{m}_i$ denotes a mean gradation value of a window 31i of the reference image 31, $\bar{u}_i$ denotes a mean gradation value of a window 32i of the received image 32, $m_j$ denotes a neighboring gradation value of the window 31i of the reference image 31, and $u_j$ denotes a neighboring gradation value of the window 32i of the received image 32.

Therefore, the foreground probability value PFG(fi|xi) of the target pixel may be calculated according to the foreground probability histogram (FIG. 4) regarding correlation values obtained by using Equations 6 and 7 above.

In operation S24, each of the pixels of the received images 32 or 61 is determined as a pixel of the foreground image if the foreground probability value PFG(fi|xi) of the pixel of the foreground image determined by using the Gaussian mixture model (operation S21) or the pixel determined to be included in the motion region (operation S22) is greater than the setting threshold $T_m$. Therefore, if information regarding a foreground image of a binary number "0" or "1" determined by using the Gaussian mixture model (operation S21) is $M_{i,GMM}$, and information regarding a motion region of the binary number "0" or "1" is $D_i$ with respect to an $i^{th}$ pixel, a foreground determination value $M_i$, motion may be obtained according to Equation 3 below.

$$M_{i,motion} = \begin{cases} 1 & \text{if } (M_{i,GMM} \vee D_i) \cdot p_{FG}(f_i \mid x_i) \geq T_m \\ 0 & \text{otherwise} \end{cases} \quad \text{[Equation 8]}$$

In Equation 8 above, an OR operation is performed on the information $M_{i,GMM}$ regarding the foreground image determined by using the Gaussian mixture model and the information $D_i$ regarding the motion region (operation S24a of FIG. 6). Then, multiplication is performed on a result of the OR operation and the foreground probability value PFG(fi|xi), and an operation of determining whether a pixel is a foreground pixel is performed on a result of the multiplication (operation S24b of FIG. 6).

Therefore, according to an embodiment described with reference to FIGS. 1 through 6, the image processing method may be robust and enhance separation accuracy with respect to an environment including a reflector and a frequent change in illumination such as the inside of an elevator.

In addition, in a case where Equation 8 above is applied to each pixel of images of the inside of the elevator, if a determined foreground image is not connected to an image of a floor of the elevator, the determined foreground image is set as the background image. That is, characteristics of the elevator may be used to correct a separation error due to the reflector. This will now be described in detail with reference to FIGS. 7 through 11.

Figure 7:
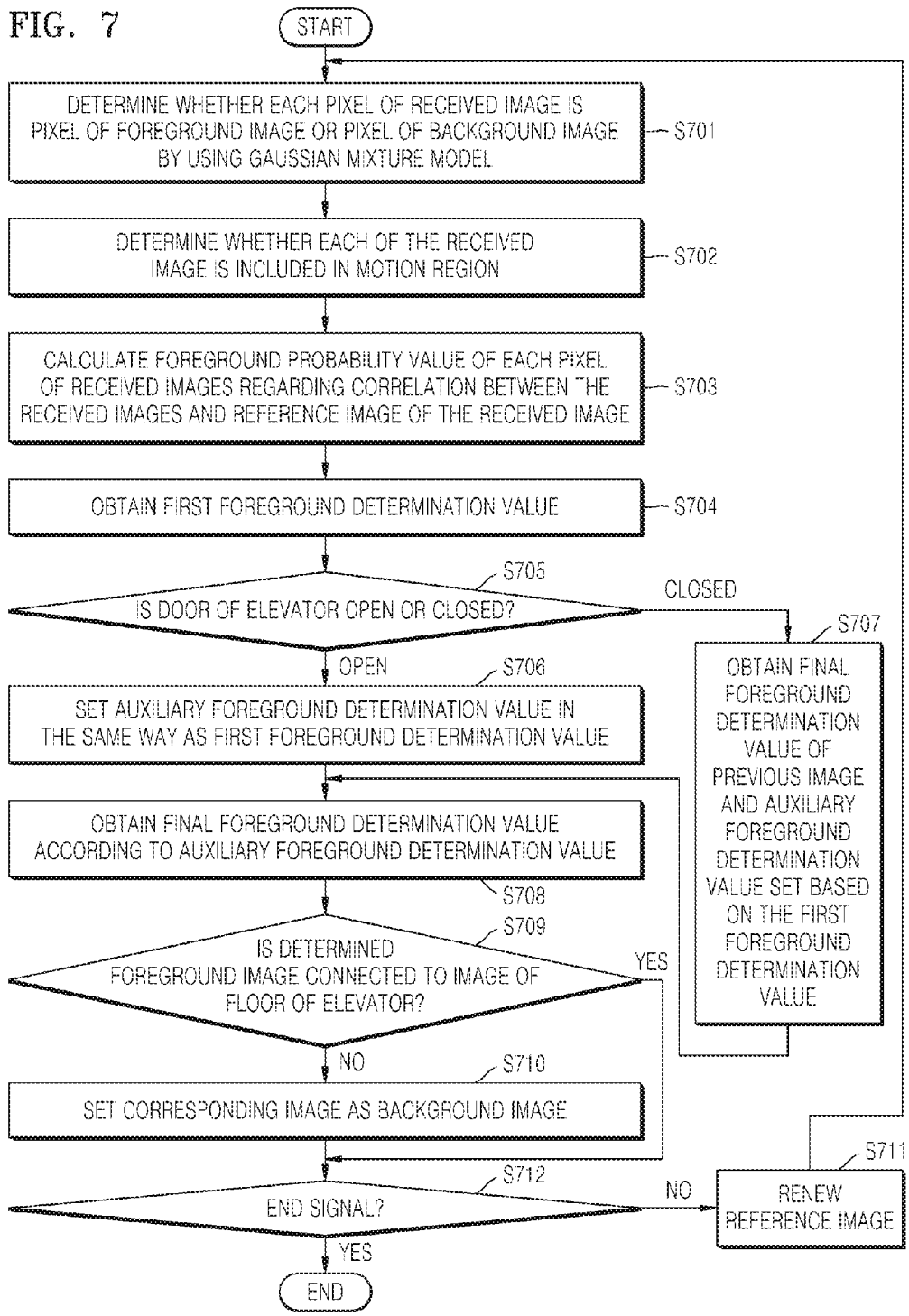
FIG. 7 is a flowchart of an image processing method, according to another exemplary embodiment.
Figure 8:
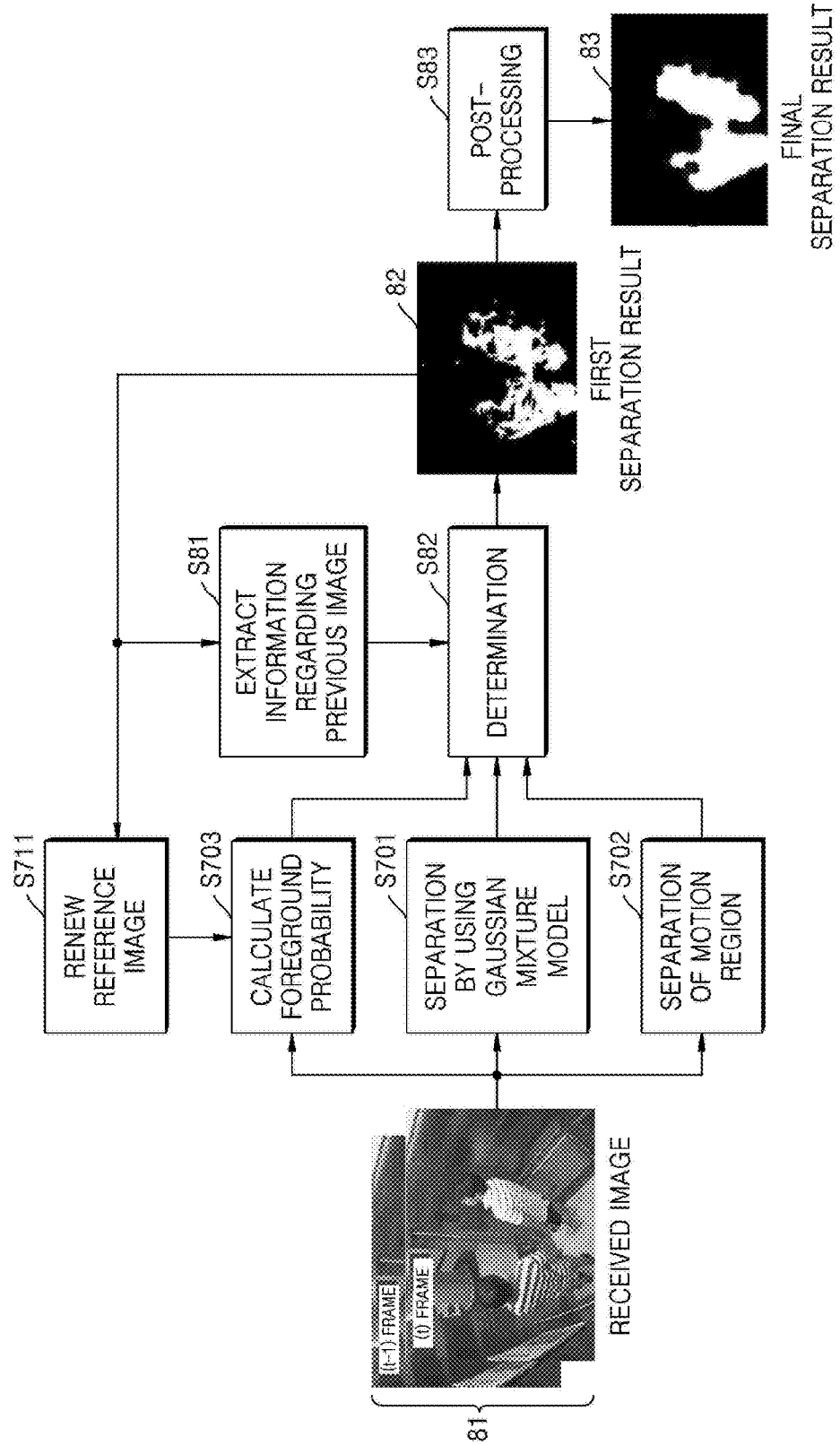
FIG. 8 is a block flowchart for explaining the image processing method of FIG. 7, according to an exemplary embodiment.
Figure 9:
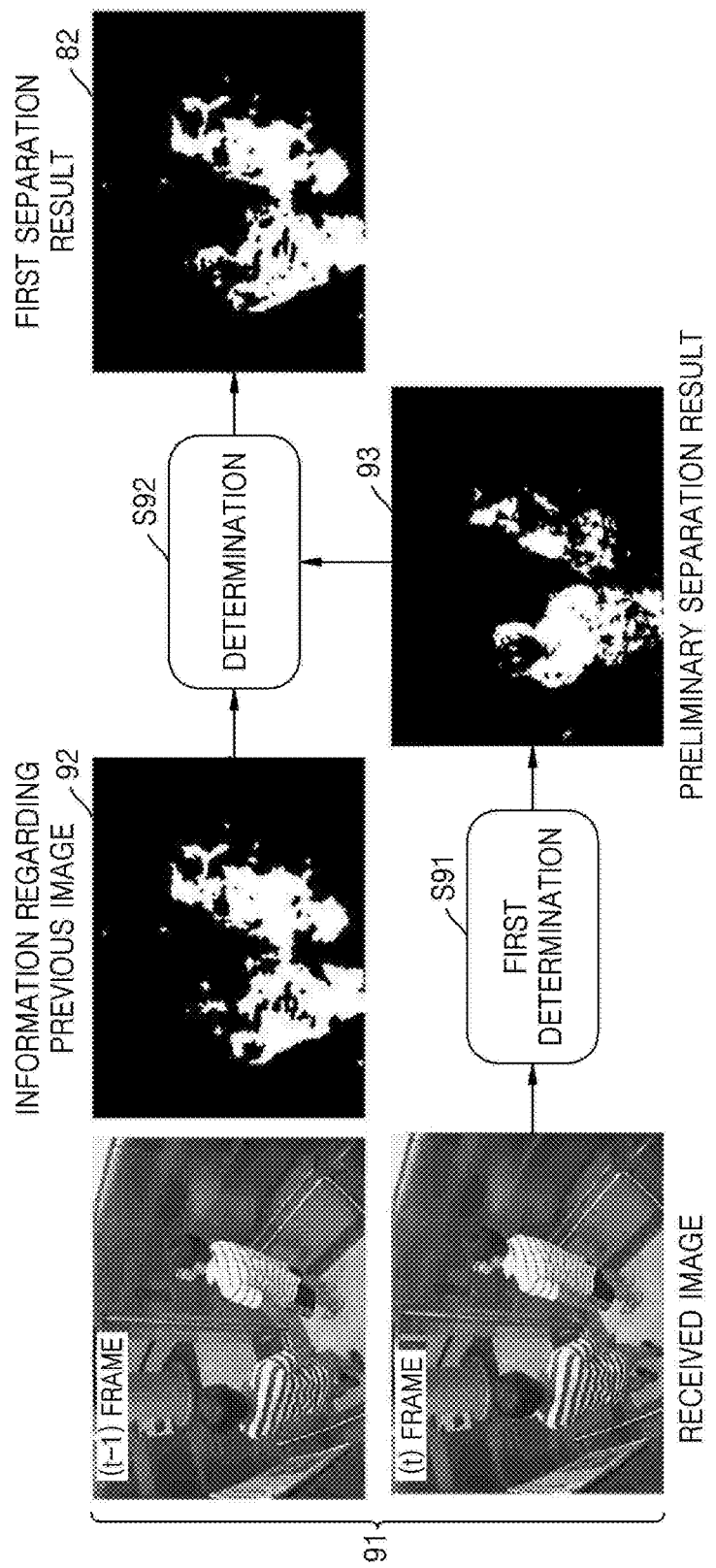
FIG. 9 is a screen image block diagram for explaining a determination operation of FIG. 8, according to an exemplary embodiment.
Figure 10:
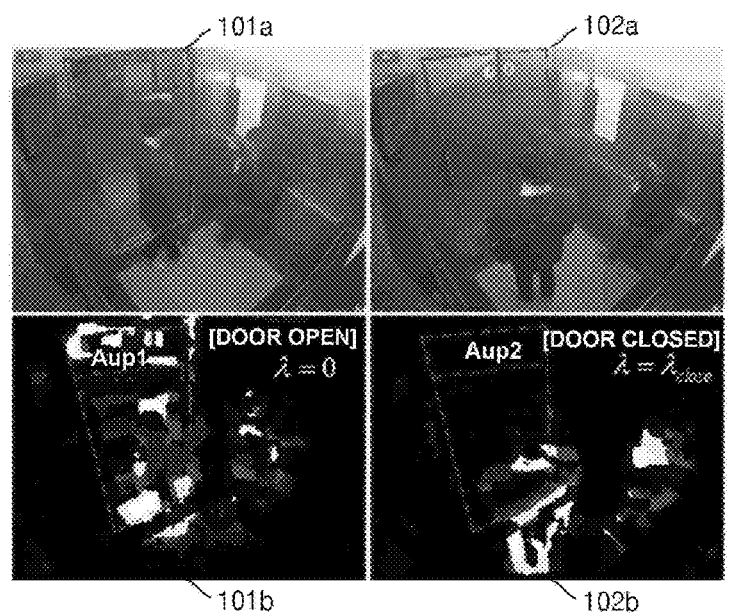
FIG. 10 is a screen image for explaining some operations of the image processing method of FIG. 7, according to an exemplary embodiment.
Figure 11:
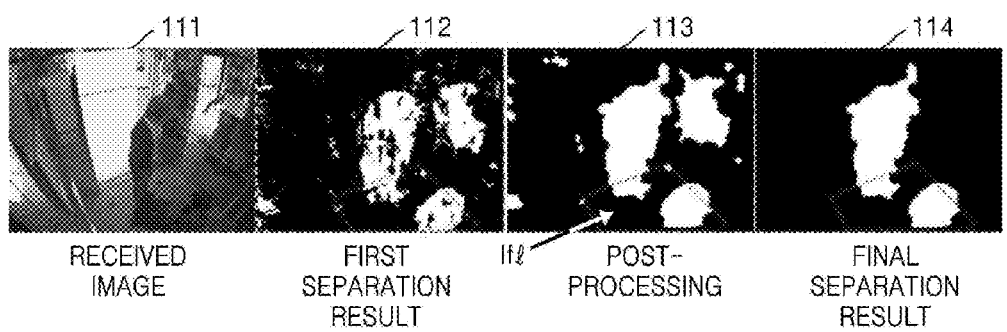
FIG. 11 is a screen image for explaining a post-processing operation of FIG. 8, according to an exemplary embodiment.

FIG. 7 is a flowchart of an image processing method, according to another exemplary embodiment. FIG. 8 is a block flowchart for explaining the image processing method of FIG. 7. FIG. 9 is a screen image block diagram for explaining a determination operation S82 of FIG. 8. FIG. 10 is a screen image for explaining operations S705 through S707 of FIG. 7. FIG. 11 is a screen image for explaining a post-processing operation S83 of FIG. 8. The post-processing operation S83 of FIG. 8 includes operations S709 and S710 of FIG. 7.

The same reference numerals of FIGS. 7 through 11 denote the same elements.

Referring to FIGS. 7 through 11, the image processing method of FIG. 7 receives an image 81, 91, 101a, 102a or 111 from a surveillance camera for capturing an inside of an elevator, determines whether each pixel of the received image 81, 91, 101a, 102a or 111 is a pixel of a foreground image or a pixel of a background image, and separates the received image 81, 91, 101a, 102a or 111 into a foreground image and a background image, and includes operations S701 through S712.

In operation S701, a Gaussian mixture model is used to determine whether each pixel of the received images 81, 91, 101a, 102a or 111 is a pixel of the foreground image or a pixel of the background image. Operation S701 is the same as described with reference to S21 of FIG. 2.

In operation S702, it is determined whether each of the received images 81, 91, 101a, 102a, or 111 is included in a motion region. That is, the motion region is separated from the received image 81, 91, 101a, 102a or 111. In addition to an algorithm for detecting the motion region that uses optical flow, various other algorithms are well known, and thus, detailed descriptions thereof are omitted here.

In operation S703, the foreground probability value PFG (fi|xi) of each of pixels of the received image 81, 91, 101a, 102a or 111 is calculated according to the foreground probability histogram (FIG. 4) regarding the correlation fi between the received image 81, 91, 101a, 102a or 111 and the reference image 31 of the received images 81, 91, 101a, 102a or 111.

In the present embodiment, the reference image 31 is separated into a foreground and a background and is renewed (operation S711) to a previous image during a process of repeatedly performing operations S701 through S712 until an end signal is generated (operation S712). Thus, accuracy of the foreground probability value PFG(fi|xi) increases. Operation S703 is the same as described with reference to S23 of FIG. 2.

In operation S704, a first foreground determination value $M_i^{(t)}$, motion is obtained. That is, if the foreground probability value PFG(fi|xi) of the pixel of the foreground image determined by using the Gaussian mixture model (operation S21) or the pixel determined to be included in the motion region (operation S22) is greater than the setting threshold $T_m$, a foreground-information binary number "1" is obtained as a first foreground determination value $M_i^{(t)}$, motion of each of pixels of the received images 81, 91, 101a, 102a or 111, and, if the foreground probability value PFG(fi|xi) is not greater than the setting threshold $T_m$, a background-information binary number "0" is obtained as the first foreground determination value $M_i^{(t)}$, motion.

Operation S704 is the same as described with reference to S24 of FIG. 2. That is, although $M_i$, motion denotes the foreground determination value in Equation 8 above, $M_i^{(t)}$, motion denotes the foreground determination value at the time t that is a time at which a currently received image is processed, i.e., the first foreground determination value.

Operations S701 through S704 above correspond to a first determination operation (S91 of FIG. 9) of producing a preliminary separation result (93 of FIG. 9). Also, operations S705 through S708 below correspond to a determination operation (S92 of FIG. 9) of using the preliminary separation result (93 of FIG. 9) and information regarding a previous image (92 of FIG. 9).

Thus, the determination operation S82 of FIG. 8 includes the first determination operation (S91 of FIG. 9) and the determination operation (S92 of FIG. 9).

Operations S709 and S710 below correspond to the post-processing operation S83 of FIG. 8.

Operations S705 through S710 will now be described in detail.

In operation S705, it is determined whether a door of the elevator is open or closed.

In this regard, if a mean foreground probability value $P_{FG\_MEAN}$ of pixels corresponding to top portions Aup1 and Aup2 of FIG. 10, of the door of the elevator is greater than a setting mean threshold, the door of the elevator is determined to be open. That is, images of the top portions Aup1 and Aup2 of the door of the elevator scarcely change due to presence of people, and thus, the mean foreground probability value $P_{FG\_MEAN}$ is low when the door of the elevator is closed, and the mean foreground probability value $P_{FG\_MEAN}$ is high when the door of the elevator is open, thereby accurately determining whether the door of the elevator is open or closed.

In operation S706, which is performed when the door of the elevator is open, an auxiliary foreground determination value $Q^{(t)}$ is set in the same way as a first foreground determination value $M_i^{(t)}$, motion.

In operation S707 performed when the door of the elevator is closed, a final foreground determination value $M_i^{(t-1)}$, final of the previous image and the auxiliary foreground determination value $Q^{(t)}$ set based on the first foreground determination value $M_i^{(t)}$, motion are obtained.

That is, operations S706 and S707 above may be performed according to Equation 9 below.

$$Q^{(t)} = [(1-\lambda)M_{i,motion}^{(t)} + \lambda M_{i,final}^{(t-1)}] \quad \text{[Equation 9]}$$

In Equation 9 above, a parameter $\lambda$ has a value "0" when the door of the elevator is open. Thus, in operation S706 performed when the door of the elevator is open, the auxiliary foreground determination value $Q^{(t)}$ is set in the same way as a first foreground determination value $M_i^{(t)}$, motion (see 101a and 101b of FIG. 10).

Also, in Equation 9 above, the parameter $\lambda$ has a value $\lambda_{close}$ greater than "0" and smaller than "1" when the door of the elevator is closed. According to an experiment of the present embodiment, the parameter $\lambda$ may have about "0.65" when the door of the elevator is closed. Thus, in operation S707 performed when the door of the elevator is closed, the final foreground determination value $M_i^{(t-1)}$, final of the previous image and the auxiliary foreground determination value $Q^{(t)}$ set based on the first foreground determination value $M_i^{(t)}$, motion are obtained (see 102a and 102b of FIG. 10).

Next, in operation S708, if a result obtained by multiplying the auxiliary foreground determination value $Q^{(t)}$ and the foreground probability value PFG(fi|xi) is greater than a final threshold $T_b$, a foreground-information binary number "1" is obtained as a final foreground determination value $M_i^{(t)}$, final, and, if the result is not greater than the final threshold $T_b$, a background-information binary number "0" is obtained as the final foreground determination value $M_i^{(t)}$, final. That is, operation S708 may be expressed according to Equation 10 below.

$$M_{i,final}^{(t)} = \begin{cases} 1 & \text{if } Q^{(t)} \cdot p_{FG}(f_i \mid x_i) \geq T_b \\ 0 & \text{otherwise} \end{cases} \quad \text{[Equation 10]}$$

In summary, since a subject hardly moves when the door of the elevator is closed, accuracy of the first foreground determination value $M_i^{(t)}$, motion may deteriorate. In this case, the final foreground determination value $M_i^{(t-1)}$, final of the previous image and the auxiliary foreground determination value $Q^{(t)}$ set based on the first foreground determination value $M_i^{(t)}$, motion are used, thereby preventing a separation error from occurring when the door of the elevator is closed.

Operations S709 and S710 below correspond to the post-processing operation (S83 of FIG. 8). In the post-processing operation (S83 of FIG. 8), small foreground errors in drop shapes may be removed by using a well known morphological image process before operation S709 below is performed.

That is, an image 112 of FIG. 11 indicating a first separation result is obtained by performing Equation 10. Also, an image 113 of FIG. 11 indicates a result obtained by removing small foreground errors in drop shapes by using the well known morphological image process. In this regard, an image 114 indicating a final separation result may be obtained by performing operations S709 and S710 below.

In operation S709, it is determined whether a determined foreground image is connected to an image Ifl of FIG. 11 of a floor of the elevator.

If a determined foreground image is not connected to the image Ifl of FIG. 11 of the floor of the elevator, the determined foreground image is set as the background image (operation S710).

Accordingly, the image 114 indicating the final separation result is obtained. That is, the separation error due to a reflector may be corrected by using characteristics of the elevator.

As described above, the image processing methods according to the exemplary embodiments obtain a foreground probability value of each pixel of a received image according to a foreground probability histogram of a correlation between the received image and a reference image of the received image. Also, each pixel of the received image is determined as a pixel of a foreground image if the foreground probability value of a pixel of a foreground image determined by using a Gaussian mixture model or a pixel determined to be included in a motion region is greater than a setting threshold.

Therefore, the image processing methods may be robust and enhance separation accuracy with respect to an environment including a reflector and a frequent change in illumination such as the inside of an elevator.

Furthermore, the reference image is renewed to a previous image including foreground and background information, and thus, accuracy of the foreground probability value may increase.

Furthermore, a texture value of a target pixel that is a difference between a mean gradation value of the target pixel and neighboring pixels and gradation values of the neighboring pixels is used to calculate the correlation between the received image and the reference image of the received image with respect to each pixel of the received image. Thus, the image processing methods may be robust and further enhance separation accuracy.

In a case where a determined foreground image is not connected to an image of a floor of the elevator, the determined foreground image is set as a background image. That is, a separation error due to a reflector may be corrected by using characteristics of the elevator.

Meanwhile, when a door of the elevator is open, the auxiliary foreground determination value $Q^{(t)}$ is set in the same way as a first foreground determination value $M_i^{(t)}$, motion, and when the door of the elevator is closed, the final foreground determination value $M_i^{(t-1)}$, final of the previous image and the auxiliary foreground determination value $Q^{(t)}$ set based on the first foreground determination value $M_i^{(t)}$, motion are obtained. If a result obtained by multiplying the auxiliary foreground determination value $Q^{(t)}$ and the foreground probability value PFG(fi|xi) is greater than the final threshold $T_b$, the foreground-information binary number "1" is obtained as a final foreground determination value $M_i^{(t)}$, final, and, if the result is not greater than the final threshold $T_b$, the background-information binary number "0" is obtained as the final foreground determination value $M_i^{(t)}$, final.

In this regard, since a subject hardly moves when the door of the elevator is closed, accuracy of the first foreground determination value $M_i^{(t)}$, motion may deteriorate. In this case, the final foreground determination value $M_i^{(t-1)}$, final of the previous image and the auxiliary foreground determination value $Q^{(t)}$ set based on the first foreground determination value $M_i^{(t)}$, motion are used, thereby preventing a separation error from occurring when the door of the elevator is closed.

Meanwhile, if the mean foreground probability value $P_{FG\_MEAN}$ of pixels corresponding to top portions of the door of the elevator is greater than the setting mean threshold, the door of the elevator is determined to be open. That is, images of the top portions of the door of the elevator scarcely change due to the presence of people, and thus the mean foreground probability value $P_{FG\_MEAN}$ is low when the door of the elevator is closed, and the mean foreground probability value $P_{FG\_MEAN}$ is high when the door of the elevator is open, thereby accurately determining whether the door of the elevator is open or closed.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An image processing method comprising:
   (a) determining whether a pixel of an input image is a pixel of a foreground image or a pixel of a background image by using a Gaussian mixture model;
   (b) determining whether the pixel of the input image is included in a motion region;
   (c) obtaining a foreground probability value of the pixel of the input image according to a foreground probability histogram with respect to a correlation between the input image and a reference image of the input image; and
   (d) determining the pixel of the input image as the pixel of the foreground image if the foreground probability value of the pixel of the foreground image determined as the pixel of the foreground image at operation (a) or the foreground probability value of the pixel determined to be included in the motion region at operation (b) is greater than a setting threshold.

2. The method of claim 1, wherein the input image comprises a series of frame images of video, and
   wherein operations (a) through (d) are repeatedly performed.

3. The method of claim 2, wherein, in operation (c), the reference image is separated into a foreground and a background, and is renewed as a previous image during a process of repeatedly performing operations (a) through (d).

4. The method of claim 1, wherein, in operation (c), the correlation between the input image and the reference image is calculated with respect to the pixel of the input image by using a texture value of the pixel that is a difference between a mean gradation value of the pixel and neighboring pixels and gradation values of the neighboring pixels.

5. The method of claim 1, wherein the input image is an image of an inside of a closed space captured by an image obtaining unit.

6. The method of claim 5, further comprising: (e), if the pixel determined as the pixel of the foreground image is not connected to an image of a floor of the closed space, setting the pixel determined as the pixel of the foreground image as a pixel of the background image.

7. The method of claim 5, wherein, in operation (c), the correlation between the input image and the reference image is calculated with respect to the pixel of the input image by using a texture value of the pixel that is a difference between a mean gradation value of the pixel and neighboring pixels and gradation values of the neighboring pixels.

8. The method of claim 5, wherein the input image comprises a series of frame images of video, and
wherein operations (a) through (d) are repeatedly performed.

9. The method of claim 8, wherein, in operation (c), the reference image is separated into a foreground and a background, and is renewed as a previous image during a process of repeatedly performing operations (a) through (d).

10. An image processing method of receiving an image from a surveillance camera for capturing an inside of a closed space having a door to an outside, determining whether each pixel of the received image is a pixel of a foreground image or a pixel of a background image, and separating the received image into the foreground image and the background image, the method comprising:
(a) determining whether a pixel of the received image is a pixel of a foreground image or a pixel of a background image by using a Gaussian mixture model;
(b) determining whether the pixel of the received image is included in a motion region;
(c) obtaining a foreground probability value of the pixel of the received image according to a foreground probability histogram with respect to correlation between the received image and a reference image of the received image;
(d) if the foreground probability value of the pixel of the foreground image determined as the pixel of the foreground image or the foreground probability value of the pixel determined to be included in the motion region is greater than a setting threshold, obtaining a foreground-information binary number "1" as a first foreground determination value of the pixel of the received image, and, if the foreground probability value is not greater than the setting threshold, obtaining a background-information binary number "0" as the first foreground determination value;
(e) determining whether the door of the closed space is open or closed;
(f) if the door of the closed space is open, setting an auxiliary foreground determination value in the same way as the first foreground determination value, and, if the door of the elevator is closed, obtaining a final foreground determination value of a previous image and the auxiliary foreground determination value set based on the first foreground determination value; and
(g) if a result obtained by multiplying the auxiliary foreground determination value and the foreground probability value is greater than a final threshold, obtaining a final foreground determination value as the foreground-information binary number "1", and, if the result is not greater than the final threshold, obtaining the final foreground determination value as the background-information binary number "0".

11. The method of claim 10, further comprising: (h) if the pixel determined as the pixel of the foreground image is not connected to an image of a floor of the closed space, setting the pixel determined as the pixel of the foreground image as the pixel of the background image.

12. The method of claim 10, wherein the received image comprises a series of frame images of video,
wherein operations (a) through (g) are repeatedly performed.

13. The method of claim 12, wherein, in operation (c), the reference image is separated into a foreground and a background, and is renewed as a previous image during a process of repeatedly performing operations (a) through (g).

14. The method of claim 10, wherein operation (e) comprises: if a mean foreground probability value of pixels corresponding to top portions of the door of the closed space is greater than a setting mean threshold, determining the door of the closed space to be open.

15. The method of claim 10, wherein, in operation (c), the correlation between the received image and the reference image of the received image is calculated with respect to the pixel of the received image by using a texture value of the pixel that is a difference between a mean gradation value of the pixel and neighboring pixels and gradation values of the neighboring pixels.

16. An image processing method comprising:
(a) determining whether a pixel of an input image is a pixel of a foreground image or a pixel of a background image;
(b) determining whether the pixel is included in a motion region of the input image;
(c) obtaining a foreground probability value of the pixel according to a foreground probability histogram with respect to a correlation between the input image and a reference image of the input image; and
(d) determining that the pixel is included in the foreground image if the foreground probability value of the pixel determined as the pixel of the foreground image at operation (a) or the pixel determined to be included in the motion region at operation (b) is greater than a setting threshold.

17. The method of claim 16, wherein operation (a) is performed using a Gaussian mixture model.

18. The method of claim 16, wherein, in operation (c), the correlation between the input image and the reference image is calculated with respect to the pixel of the input image by using a texture value of the pixel that is a difference between a mean gradation value of the pixel and neighboring pixels and gradation values of the neighboring pixels.

19. The method of claim 16, wherein the input image is an image of an inside of a closed space captured by an image obtaining unit, and wherein the method further comprises:
(e) if the pixel determined as the pixel of the foreground image is not connected to an image of a floor of the closed space, setting the pixel determined as the pixel of the foreground image as a pixel of the background image.

20. The method of claim 19, wherein, in operation (c), the correlation between the input image and the reference image is calculated with respect to the pixel of the input image by using a texture value of the pixel that is a difference between a mean gradation value of the pixel and neighboring pixels and gradation values of the neighboring pixels.

* * * * *